United States Patent [19]

Suzuki et al.

[11] Patent Number: 5,027,915
[45] Date of Patent: Jul. 2, 1991

[54] ELECTRIC POWER STEERING SYSTEM

[75] Inventors: Shuuetsu Suzuki, Toyota; Michitaka Terada, Anjo; Akio Hashimoto; Hiroshi Naito, both of Toyota, all of Japan

[73] Assignee: Aisin Seiki Kabushiki Kaisha, Kariya, Japan

[21] Appl. No.: 289,737

[22] Filed: Dec. 27, 1988

[30] Foreign Application Priority Data

| Dec. 26, 1987 | [JP] | Japan | 62-331477 |
| Feb. 26, 1988 | [JP] | Japan | 63-045641 |
| Mar. 31, 1988 | [JP] | Japan | 63-080295 |

[51] Int. Cl.$^5$ .................................................. B62D 5/04
[52] U.S. Cl. ..................................... 180/79.1; 192/38; 192/0.02 R
[58] Field of Search .................... 180/79.1; 74/388 PS; 192/0.02 R, 7, 38

[56] References Cited

U.S. PATENT DOCUMENTS

| 2,553,795 | 5/1951 | Staude | 180/79.1 |
| 3,243,023 | 3/1966 | Boyden | 192/8 R |
| 3,499,511 | 3/1970 | Bouhot | 192/52 R |
| 3,640,092 | 2/1972 | Neal et al. | 188/134 X |
| 4,319,672 | 3/1982 | Barthélémy | 192/0.02 R |
| 4,639,651 | 1/1987 | Shimizu | 180/79.1 |
| 4,778,021 | 10/1988 | Morishita et al. | 192/0.02 R X |
| 4,778,022 | 10/1988 | Kamiya | 180/79.1 |
| 4,852,707 | 8/1989 | Ito et al. | 192/44 |

Primary Examiner—Charles A. Marmor
Assistant Examiner—Mitchell Bompey
Attorney, Agent, or Firm—Banner, Birch, McKie & Beckett

[57] ABSTRACT

An electric power steering system includes a steering torque detecting device for detecting a steering torque applied between an input shaft connected to a steering wheel and an output shaft connected to a steering gear in response to an elastic deformation of an elastic member connecting the input shaft with the output shaft, an electric motor whose rotation is controlled by a control signal from a control device in response to a detecting signal from the steering torque detecting device, and a clutch device interposed between the electric motor and the output shaft and controlling an intermittent transmission of the rotation of the electric motor to the output shaft in response to the elastic deformation of the elastic member. Thereby, it is possible to improve the safety performance, the reliability and the steering wheel feeling of an electric power steering system.

8 Claims, 6 Drawing Sheets

ELECTRIC POWER STEERING SYSTEM

BACKGROUND OF THE INVENTION

1. Field of the Invention

The present invention relates to an electric power steering system which uses an electric motor as a power source to reduce the force required to turn the steering wheel, and more particularly, to an electric power steering system including a clutch device for insuring a fail-safe operation in the event of an abnormality such as a blockage or locking of operation of the electric motor.

2. Description of the Relevant Prior Art

A conventional electric power steering system of this kind is disclosed, for example, in Japanese Patent Laid-open Publication No. 61-37581 published on Feb. 22, 1986. This system comprises a control device for controlling electric motor movement in response to a signal from a torque detecting device which detects a steering torque generated between an input shaft connected to a steering wheel and an output shaft connected to a steering gear or to a signal from a vehicle speed detecting device which detects the vehicle speed. The control device reduces the steering force of the steering wheel connected to the input shaft.

In this system, an electromagnetic clutch is controlled by the control device and is interposed between the electric motor and a reduction device. Thereby an improvement of the steering wheel feeling is obtained by controlling the ON-OFF condition of the electromagnetic clutch by the control device in response to the vehicle speed. Further, manual steering is possible by setting the electromagnetic clutch to the OFF condition in the event of an abnormality and fail-safe operation is insured. Furthermore, in this system, a mechanical clutch as another embodiment of the clutch device is interposed between the electric motor and the reduction device. This mechanical clutch is provided with a ball which is interposed between a cylindrical shaft connected to the electric motor and a six angle shaft connected to the reduction device and transmits the power of the electric motor to the output shaft via the reduction device and does not transmit the power from the output shaft to the electric motor side. According to this mechanical clutch, in the event of an abnormality of the electric motor, for example, the electric motor locks, manual steering is possible and fail-safe operation is insured.

In the above conventional electric power steering system of this kind, however, in the case of the electromagnetic clutch controlled to an ON or OFF condition by the control device, there is a danger in that operation of the electromagnetic clutch is impossible unless the clutch device and the control device operate erroneously. As a result, there is a danger that the steering wheel feeling deteriorates rapidly. For example, when the electric motor is not able to rotate, the electromagnetic clutch is not controlled to the OFF condition by the above causes except the clutch device itself and so there is the possibility that steering is impossible. Further, for example, when the electric motor is rotated toward the opposite direction against the normal rotation direction introduced to the input shaft by the above causes, the electromagnetic clutch is not controlled to the OFF condition and there is the possibility that steering is impossible. Furthermore, in this system, when the electric motor is not able to rotate due to the entry of a foreign substance into the system, since it is not able to rapidly detect the abnormality, the electromagnetic clutch is not controlled to the OFF condition and there again is the possibility that steering is impossible. And then, since the control device is unable to decide whether it means the end of steering or an abnormality in the electric motor, there is the possibility that traveling in the vehicle will be unsafe.

Also, on the other hand, in the case of the mechanical clutch, for example, when the abnormality is generated in the control device and the electric motor is rotated toward the opposite direction against the normal rotation direction introduced to the input shaft, the load of the electric motor is transmitted to the input shaft and there is the possibility that steering will be impossible. Similar to the above-described electromagnetic clutch, since the control device is not able to rapidly detect any abnormality, there is the possibility that traveling in the vehicle will be unsafe. Further, since this mechanical clutch is constituted by a freely rotating ball which is only interposed between the cylindrical shaft and the six angle shaft, the intermittent transmission of power between the electric motor and the reduction device is unstable. In particular, when a sudden steering movement is performed under a high load condition, since the electric motor also begins to rotate at high speed, once the ball moves into the narrow space sandwiching between the cylindrical shaft and the six angle shaft at high speed, thereafter there is a possibility that the ball is reposed toward the broad space by the shock. As a result, the mechanical clutch is controlled to the OFF condition rapidly and the force required for steering rapidly becomes difficult.

The above drawbacks are created because the above prior art clutch device is constituted to be intermittent in the transmission of power between the electric motor and the output shaft by the electric signal or to be one sided in the transmission of power from the electric motor to the output shaft. The prior art device does not control the intermittence of the transmission of the power between the electric motor and the reduction device mechanically in response to the rotation of the input shaft.

As mentioned above, in the above conventional electric power steering system of this kind, there is a drawback in which the safety performance and the reliability of the electric power steering system are not adequately insured.

SUMMARY OF THE INvENTION

It is, therefore, an object of the present invention to improve the safety performance and the reliability of an electric power steering system in the event of an abnormality in the electric motor of the system and so on.

It is another object of the present invention to improve the steering wheel feeling of the electric power steering system.

It is a further object of the present invention to lessen the effects of the electric power steering system in certain situations.

It is a further object of the present invention to lessen the effects of the reliability of the clutch device of the electric power steering system in certain situations.

It is a further object of the present invention to provide an improved electric power steering system including a steering torque detecting means for detecting a steering torque applied between an input shaft connected to a steering wheel and an output shaft connected to a steering gear in response to an elastic deformation of an elastic member connecting the input shaft with the output shaft, an electric motor for controlling shaft rotation by a control signal from a control device in response to a detecting signal from the steering torque detecting means, and a clutch device interposed between the electric motor and the output shaft and controlling an intermittent transmission of the rotation of the electric motor to the output shaft by the elastic deformation of the elastic member.

According to the above structure, even though the electric motor is rotated in an opposite direction against the normal rotational direction in response to the steering torque detected by the steering torque detecting means, since the clutch device is controlled in its intermittent operation by the elastic deformation of the elastic member, only when the rotational direction of the electric motor is coincident with the direction of the elastic deformation of the elastic member will the clutch device operate so as to transmit the rotation of the electric motor to the output shaft. And then, when the rotational direction of the electric motor is not coincident with the direction of the elastic deformation of the elastic member, the clutch device is controlled to an OFF condition and does not control the transmission of the rotation of the electric motor. Thereby, manual steering is possible and steering operation is not rendered impossible.

BRIEF DESCRIPTION OF THE DRAWINGS

Additional objects and advantages of the present invention will become more apparent from the following detailed description of preferred embodiments thereof when considered with reference to the attached drawings, in which.

DETAILED DESCRIPTION OF THE PREFERRED EMBODIMENTS

An electric power steering system in accordance with preferred embodiments of the present invention will be described with reference to the drawings.

Figure 1:
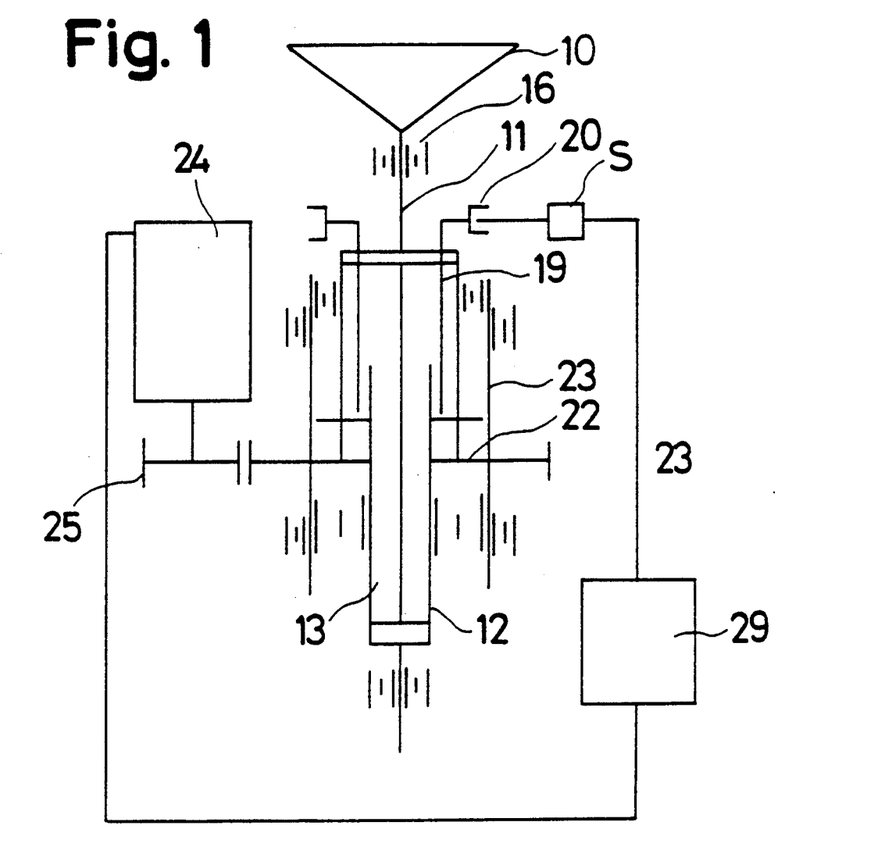
FIG. 1 is a block diagram of an electric power steering system of a first embodiment of the present invention.
Figure 2:
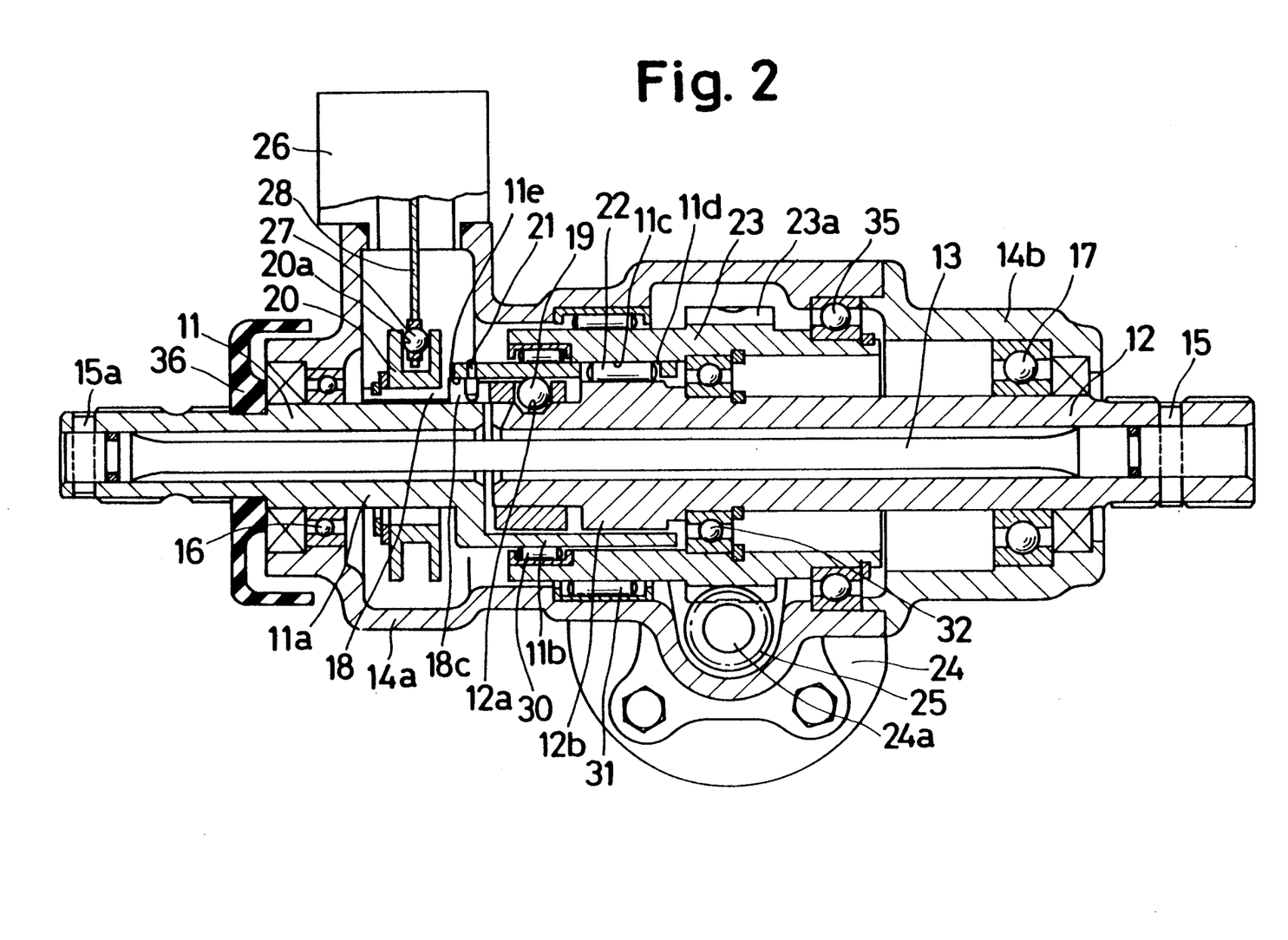
FIG. 2 is a sectional view of an electric power steering system of the present invention.

Referring to FIG. 1 and FIG. 2, an input shaft 11 connected to a steering wheel 10 at its one end has a stepped and cylindrical shape and is connected at the one end with a torsion bar 13, the torsion bar 13 being connected to an output shaft 12 at its other end. Now, the input shaft 11 is connected with the torsion bar 13 by a pin 15a and the output shaft 12 is connected with the torsion bar 13 by a pin 15b. Thereby, the input shaft 11 is connected to the output shaft 12 and, in turn, is connected to a steering gear (not shown) of a vehicle via the torsion bar 13. Further, the one end of the output shaft 12 is loosely fitted into a large-diameter portion 11b of the input shaft 11, the steering force applied to the input shaft 11 being transmitted to the output shaft 12 via the torsion bar 13. Now, the torsion bar 13 consists of an elastic member according to the present invention.

The input shaft 11 is slidably supported at the steering wheel 10 side by a bearing 16 which is fitted and secured to an upper housing 14a, and the output shaft 12 is slidably supported by a bearing 17 which is fitted and secured to a lower housing 14b.

Figure 4:
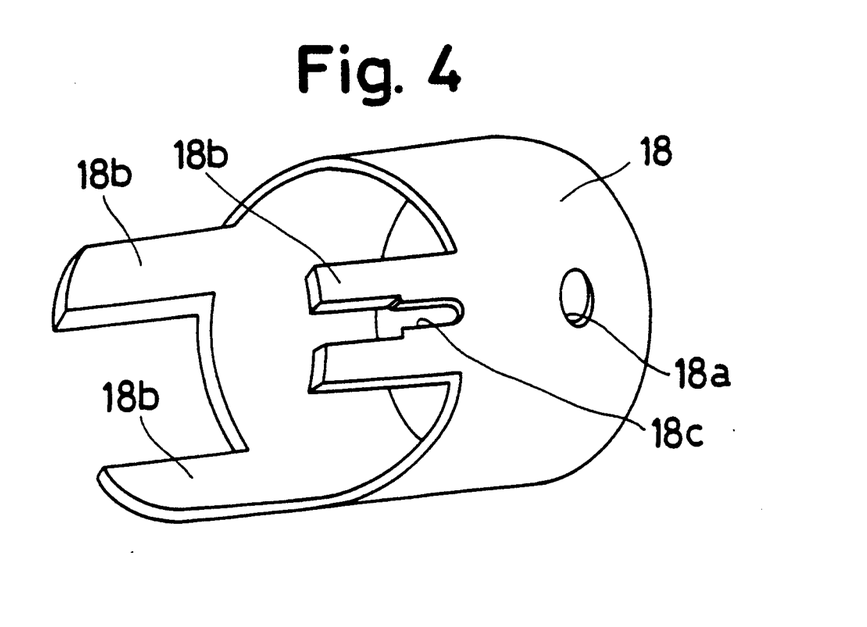
FIG. 4 is a perspective view of a cylindrical slider member of the first embodiment of the present invention.

On the outer circumference of a small-diameter portion 11a of the input shaft 11, a dust cover 36 is fitted to the outside of the upper housing 14a and finger portions 18b of a cylindrical slider member 18 as shown in FIG. 4. The cylindrical slider member 18 is loosely fitted in the upper housing 14a. On the output shaft 12 side of the slider member 18, a hole 18a of the wall of the cylinder member 18 is fitted around a ball 19 which is engaged with a spiral groove 12a formed on the outer circumference surface of the output shaft 12. The finger portions 18b are formed as three pieces of the cylinder 18 at regular intervals around the cylinder and each finger portion 18b is loosely fitted into a penetrate hole 11e which is formed in the stepped portion of the input shaft 11.

On the outer circumference of the finger portions 18b, a ring member 20 having a flange portion at both its ends and which forms a circular groove 20a between both flanges is secured to the slider member 18 so as to form one body. On the outer circumference of one finger portion 18b, an elongated slot 18c in the axial direction secures the cylindrical member 18 to a pin 21 fitted in the input shaft 11. Thereby, the slider member 18 is rotatable with the input shaft 11 and is freely movable in the axial direction. Accordingly, since the torsion bar 13 is twisted by the road resistance and road reaction force applied to the output shaft 12 when the input shaft 11 is rotated by the steering wheel 10, the slider member 18 moves in the axial direction of the input shaft 11 and the output shaft 12 by moving on the spiral groove 12a of the ball 19.

The above-described spiral groove 12a is formed in the outer circumference of the output shaft 12, and a six-angle portion 12b of output shaft 12 having a six-angle cross sectional area is also formed therein. The large-diameter portion 11b of the input shaft 11 is extended to overlap the six-angle portion 12b of the output shaft 12. An angle portion 11c of the input shaft corresponding to the six-angle portion 12b of the output shaft 12 is formed on the fitted surface of the large-diameter portion 11b of the input shaft between the large diameter portion 11b and the six-angle portion 12b of the output shaft. Thereby, a predetermined gap is formed between the angle portion 11c of the input shaft and the six-angle portion 12b of the output shaft.

Figure 3A:
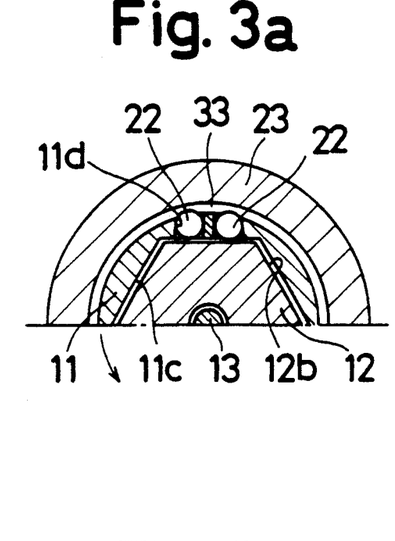
FIGS. 3a through 3d are diagrams of the operation of a clutch device of the first embodiment of the present invention.
Figure 3B:
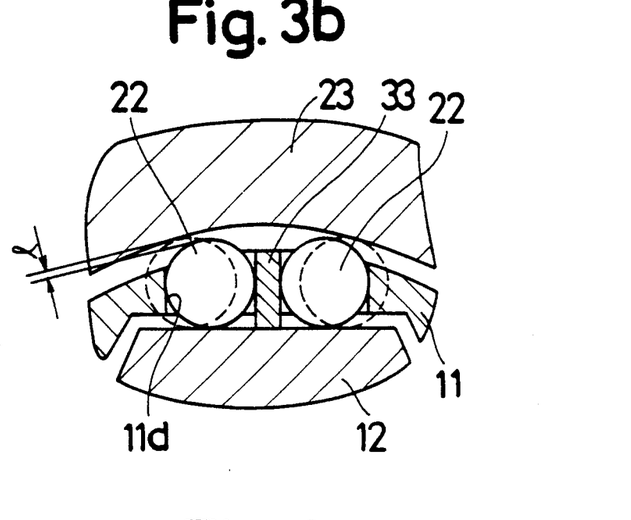
Figure 3C:
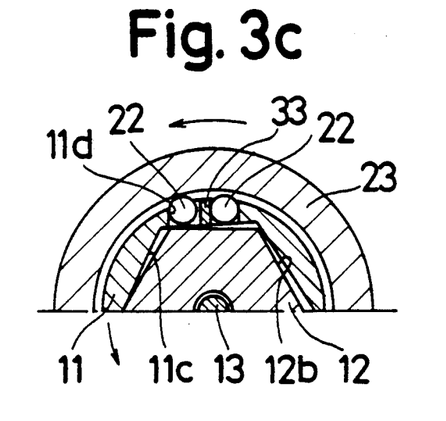
Figure 3D:
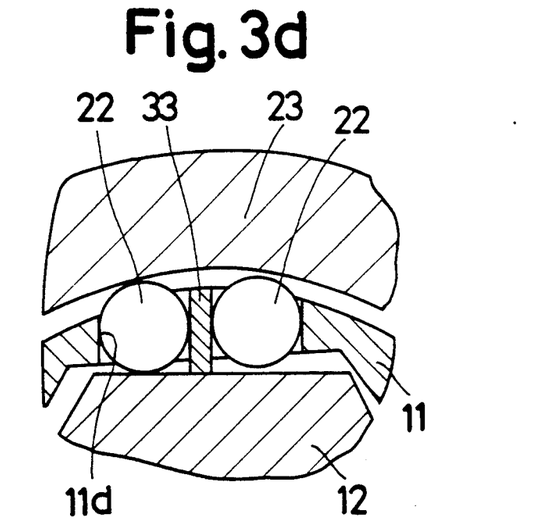
Figure 3E:
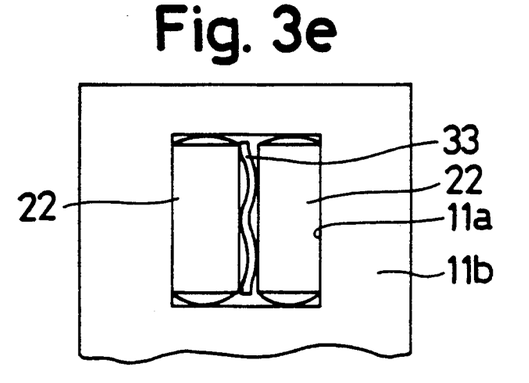
FIG. 3e is a plane view of the clutch device of the present invention.

In the angle portion 11c which is formed in the large-diameter portion 11b of the input shaft 11, three holes 11d are formed at regular interval positions around the input shaft. In each of the holes 11d, a pair of engaging members 22 (FIG. 3a) is fitted therein so as to coincide its axial center to the axial directions of the input shaft 11 and the output shaft 12. A wave-shaped spring 33, as shown in FIG. 3e, is interposed between each pair of engaging members 22, respectively. Thereby, each engaging member 22 is pressed on the end surface in the circumferential direction of each hole 11d and contacts with each end surface of the six-angle portion 12b. Now, the angle portion 11c, the six-angle portion 12b and the engaging member 22 altogether comprise a clutch device of the present invention with an outer sleeve 23 which will be explained in greater detail herein.

On the outside of the large-diameter portion 11b of the input shaft 11, the outer sleeve 23 is slidably supported by a bearing 35 which is fitted and secured to the upper housing 14a and a bearing 32 which is secured on the output shaft 12 so as to form a predetermined gap l (FIG. 3b) between the engaging member 22 and its inner surface. A worm wheel 23a engages a worm gear 25 secured to an output shaft 24a of an electric motor 24 located on the outer circumference of the upper housing surface. The worm wheel 23a and the worm gear 25 together comprise a reduction device. Now, in FIG. 2, numerals 30 and 31 indicate bearings supporting the large-diameter portion 11b of the input shaft 11 and the outer sleeve 23 in relation to upper housing 14a, respectively.

A case 26 is installed on the upper housing 14a. At another end of lever member 28 from that connected to case 26 is a metal plate holding a ball 27, the ball, plate and lever being secured to the case 26. The ball 27 is fitted into a circular groove 20a of the ring member 20. On the side surface of the lever member 28, an isolation layer is coated and a strain gage (not shown) constituted by a resistance bridge is located on the isolation layer. Now, the strain gage constitutes a well known strain detecting circuit consisting of a bridge circuit. The electric signal from the strain gage is input to a control device 29 (FIG. 1) and the control device 29 controls the current which is supplied to the electric motor 24 in response to the electric signal.

This embodiment of the present invention consisting of the above-described structure operates as follows.

When the steering wheel 10 is rotated, the torsion bar 13 is twisted by the input shaft in relation to the output shaft 12 which reacts to the load of the road reaction. Consequently, there is generated a relative rotation between the input shaft 11 and the output shaft 12.

Thereby, the slider member 18 is rotated with the input shaft 11 in accordance with the relative rotation, namely the rotational difference of the input shaft 11 in regard to the output shaft 12 via the pin 21. As a result, the ball 19 fitting into the hole 18a of the cylindrical slider member 18 is moved along the spiral groove 12a of the output shaft 12 and a thrust in the axial direction is given to the slider member 18 via the ball 19. Namely, the relative rotation between the input shaft 11 and the output shaft 12 is converted into movement in the axial direction of the slider member 18 and the slider member 18 is moved toward the axial direction of the input shaft 11 in response to the rotational direction of the input shaft 11 and the measure of relative rotation between the input shaft 11 and the output shaft 12.

The movement in the axial direction of the slider member 18 makes the lever member 28 bend via the ball 27 engaging the circular groove 20a of the ring member 20 and makes the strain gage generate an electric signal in response to the measure and the direction of relative rotation between the input shaft 11 and the output shaft 12. This electric signal is fed to the control device 29 and the control device 29 outputs current in response to this electric signal for supplying power to run the electric motor 24. Thereby, the electric motor 24 is rotated in the direction corresponding to the rotational direction of the input shaft 11 in response to the measure of the relative rotation between the input shaft 11 and the output shaft 12. The rotation of the electric motor 24 is reduced in speed by the reduction device comprising the worm gear 25 and the worm wheel 23a and is transmitted to the outer sleeve 23.

At this time, according to the present invention, the intermittent operation of the clutch device is accomplished as follows. Namely, in the OFF condition of the clutch device (the steering torque detecting means S (FIG. 1) is positioned in the neutral condition) as shown in FIG. 3b, the predetermined gap l exists between each engaging member 22 and the inner surface of the outer sleeve 23. Neither the input shaft 11 nor the output shaft 12 are connected to the outer sleeve 23, namely, to the electric motor 24. When the input shaft 11 is rotated toward the allow direction (counterclockwise) from this condition, a relative rotation is generated between the input shaft 11 and the output shaft 12, and the relative rotation makes the gap l between the engaging member 22 of the rotational side of the input shaft 11 and the outer sleeve 23 disappear and makes the engaging member 22 of the rotational side of the input shaft 11 of each pair of engaging members 22 in each of holes 11d press the end surface of the six-angle portion 12b and the inner surface of the outer sleeve 23 by compressing the spring 33. Thereby, the clutch device becomes set to an ON condition as shown in FIG. 3d.

Figure 5:
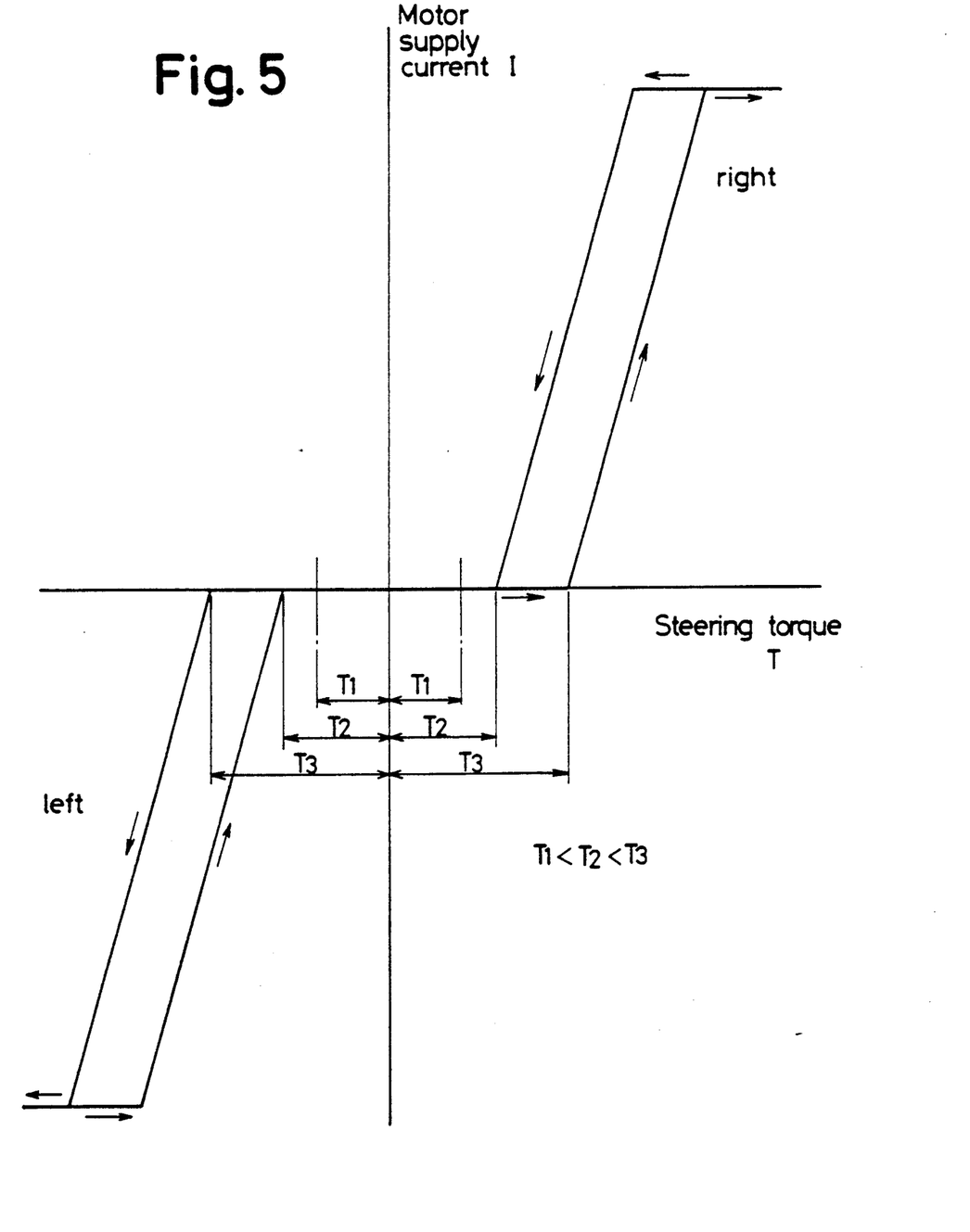
FIG. 5 is a diagram of motor supply current versus steering torque showing characteristics of operation of the clutch device of the present invention.

At this time, according to the present invention, the relationship between the relative rotation of the input shaft 11 and the output shaft 12 (the elastic deformation of the torsion bar 13 = the steering torque T) and the motor supply current I of the electric motor 24 is predetermined as shown in FIG. 5. Namely, the relative rotation between the input shaft 11 and the output shaft 12 (the elastic deformation of the torsion bar 13 = the steering torque T1) by which the clutch device becomes set to an ON condition is smaller than the relative rotation between the input shaft 11 and the output shaft 12 (the elastic deformation of the torsion bar 13—the steering torque T3) by which the electric motor 24 begins to rotate via the current supplied to the motor and controlled by the control device 29 in response to the signal from the strain gage. As a result, after the engaging member 22 of the rotational side of the input shaft 11 of each pair of engaging members 22 in each hole 11d is pressed to the end surface of the six-angle portion 12b and the inner surface of the outer sleeve 23 by the relative rotation of the input shaft 11, the electric motor 24 begins to rotate and its rotation is transmitted to the outer sleeve 23. Thereby, under the condition by which the engaging member 22 of the rotational side of the input shaft 11 is pressed to the end surface of the six-angle portion 12b and the inner surface of the outer sleeve 23, the rotation of the outer sleeve 23 is smoothly transmitted to the output shaft 12 via the engaging member 22 and the steering force which is applied to the steering wheel 10 is assisted. At this time the rotational direction of the outer sleeve 23 is in the direction controlled by the control device 29 so as to coincide with the direction of the relative rotation of the input shaft 11 coinciding with the direction of the elastic deformation of the torsion bar 13. Thereby, the outer sleeve 23 makes each engaging member 22 strongly press to the six-angle portion 12b and the transmission of the rotational force is accomplished assuredly. Now, the relationship between the relative rotation of the input shaft 11 and the output shaft 12 (the elastic deformation of the torsion bar 13 the steering torque T) and the motor supply current I of the electric motor 24 has a hysteresis between the steering torque T3 at which the electric motor 24 begins to rotate and the steering torque T2 at which the electric motor 24 completes rotation as shown in FIG. 5. Thereby the variation in the rotation of the electric motor 24 due to noise and so on is prevented. Now, the relative rotation (the steering torque T1) by which the gap between the engaging member 22 of the rotational side of the input shaft 11 and the outer sleeve 23 disappears and the clutch device becomes set to the ON condition is predetermined by the various combinations among the inner diameter size of the outer sleeve 23, the outer diameter size of the engaging member 22, the width of the parallel surfaces of the six-angle portion 12b of the output shaft 12, the magnitude of the rotational direction of the holes 11d, the spring constant and size of the spring member 33 and so on according to design choice. The relative rotation between the input shaft 11 and the output shaft 12 (the elastic deformation of the torsion bar 13=T3) is predetermined by the inclination of the spiral groove 12a of the output shaft 12 in relation to the axial center of the output shaft 12 according to design choice.

Now, at this time, when a driver makes the input shaft 11 further rotate in the allow direction (counterclockwise) in order to increase the current supplied to the electric motor 24, according to FIG. 3b, the engaging member 22 of the rotational side of the input shaft 11 of each pair of the engaging members 22 in each of holes 11d is positioned as shown, but the engaging member 22 of the opposite side of the rotational side of the input shaft 11 is moved toward the rotational side of the input shaft 11 by the large-diameter portion 11b of the input shaft 11 with the bending of the spring member 33. Accordingly, in proportion to the size of the road reaction force, the relative rotation between the input shaft 11 and the output shaft 12 and the rotational force of the electric motor 24, the clutch device acts so as to increase its engaging force by the pressing force of the engaging member 22 of the rotational side due to the spring member 33. Thereby, the clutch device assuredly transmits the rotation force of the electric motor 24. Consequently, if the appropriate pressing force is not given to each pair of engaging members 22, for example, in the case of of a quick steering movement accomplished in spite of the condition in which the road reaction force is large and the relative rotation between the input shaft 11 and the output shaft 12 also becomes large, the electric motor 24 is rotated at high speed and the engaging member 22 of the rotational side of the input shaft 11 are suddenly engaged with the output shaft 12 and the outer sleeve 23. As a result, the phenomenon in which the engaging member 22 rebounds is created and the clutch device is set to an OFF condition, the steering force becoming heavy for a moment by the sudden disappearance of the assist provided by electric motor 24.

To the contrary, according to this embodiment, since the pressing force of the engaging member 22 of the rotational side of the input shaft 11 becomes large in proportion to the size of the relative rotation between the input shaft 11 and the output shaft 12, even though in the event of a quick steering movement and in spite of the condition in which the road reaction force is large, an engaging force is ensured and stability of motor assistance is accomplished.

Figure 6:
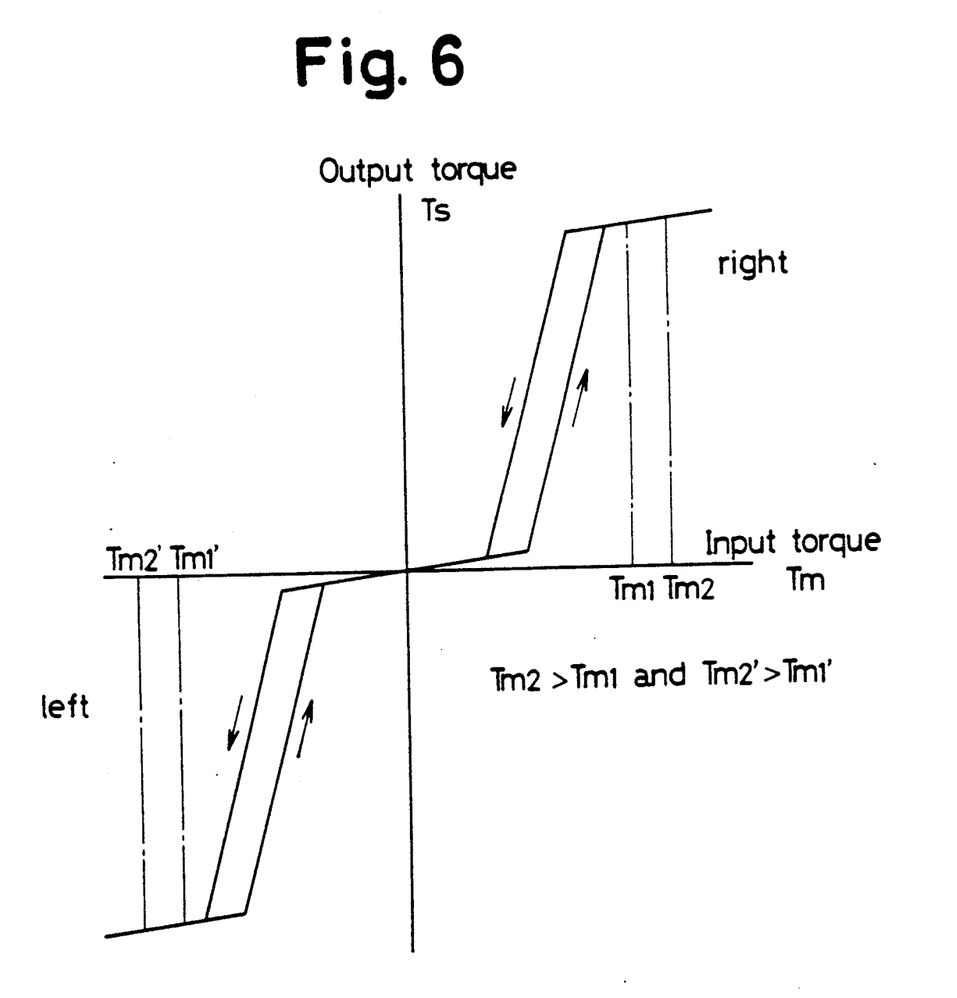
FIG. 6 is a diagram of output torque versus input torque showing characteristics of operation of the clutch device of the present invention.

Further, according to FIG. 6 of the present invention, the relationship between the input torque Tm (the relative rotation between the input shaft 11 and the output shaft 12 the measure of elastic deformation of the torsion bar 13 the steering torque applied to the steering wheel 10) and the output torque Ts (the torque of the output shaft 12) is predetermined. Namely, the input torque Tm2, Tm2' (the measure of elastic deformation of the torsion bar 13=the input torque Tm) by which the spring member 33 is completely compressed (the wave-shaped spring member 33 is completely extended) is larger than the input torque Tm1, Tm1' by which the input shaft 11 is mechanically connected to the output shaft 12 (the input shaft 11 is directly connected to the output shaft 12). Consequently, transmission of the rotational force between the input shaft 11 and the output shaft 12 is prevented by the action of the spring member 33 which is completely compressed. Thereby, damage of the spring member 33 is prevented and the reliability of the clutch device is improved. In this embodiment, the mechanical connection between the input shaft 11 and the output shaft 12 is accomplished by the engagement between the inner surface of the angle portion 11c of the input shaft 11 and the outer surface of the six-angle portion 12b of the output shaft 12. The relative rotation between the input shaft 11 and the output shaft 12 by which the mechanical connection is accomplished is predetermined by the combinations among the spring constant of the torsion bar 13, the size of the inner diameter of the outer sleeve 23, the size of the outer diameter of each engaging member 22, the width of the parallel surfaces of the six-angle portion 12b, the width of the parallel surfaces of the angle portion 11c, the size of the rotational direction of the holes 11d, the spring constant and size of the spring member 33 and so on. Now, the relative rotation by which the mechanical connection is accomplished is predetermined so long as the relationship by which Tm1 (Tm1') is smaller than Tm2 (Tm2') is maintained. Alternatively, it is possible to use a coil spring for the wave-shaped spring member 33 depending on the desired spring constant.

As mentioned above, the clutch device operates so as to transmit the rotation of the electric motor 24 to the output shaft 12 only when the relative rotation (the steering torque T) between the input shaft 11 and the output shaft 12 becomes more than the predetermined value (the steering torque T1) and the direction of the relative rotation coincides with the rotational direction of the outer sleeve 23. Accordingly, even though the electric motor 24 is rotated in an opposite direction (clockwise) in relation to the rotational direction (counterclockwise) corresponding to the relative rotation of the input shaft 11 by an erroneous operation of the control device 29, under the condition in which the engaging member 22 of the rotational side of the input shaft 11 makes contact with the inner surface of the outer sleeve 23 and the end surface of the six-angle portion 12b as shown in FIG. 3c, the engaging member 22 of the rotational side of the input shaft 11 vibrates and revolves in a clockwise direction (i.e., slippingly contacts the inner and end surfaces) in each of holes 11d. Since the clutch device is now effectively in the OFF condition, the rotation of the outer sleeve 23 is not transmitted to the input shaft 11 and the output shaft 12.

To the contrary, the rotation of the input shaft 11 is transmitted to the output shaft 12 by the mechanical connection due to the engagement between the angle portion 11c and the six-angle portion 12b and the torsion bar 13, so that manual steering is then possible.

Further, when the electric motor 24 suddenly rotates at high speed in the same direction in relation to the rotational direction corresponding to the relative rotation between the input shaft 11 and the output shaft 12 by an erroneous operation of the control device 29 and so on, the input shaft 11 side becomes resistive. The engaging member 22 on the left side is pressed rightwardly (the opposite direction to the rotational direction) by the end surface of the left side of the hole 11d in FIG. 3d. As a result, the engaging member 22 on the left side of the pair of members 22 is separated from the inner surface of the outer sleeve 23 in FIG. 3d and the clutch device is set to an OFF condition. Therefore, the rotation of the input shaft 11 is transmitted to the output shaft 12 by the torsion bar 13 and the above mechanical connection, and manual steering is again possible.

And further, when the electric motor 24 enters a condition in which it is not able to rotate due to the entry of a foreign substance and the outer sleeve 23 is not able to rotate, the engaging member 22 on the left side of the pair of members 22 vibrates and revolves (i.e., slips) against the spring member 33 caused by the frictional force between the outer sleeve 23 and the member 22 in FIG. 3d. The clutch device is now effectively in the OFF condition. Therefore, the rotation of the input shaft 11 is transmitted to the output shaft 12 by the torsion bar 13 and the above-described mechanical connection, and manual steering is possible. Consequently, when the electric motor 24 arrives at a condition in which it is not able to rotate and the rotation of the input shaft 11 is not assisted by the electric motor 24 and the input shaft 11 is not further rotated in the assisted direction, engaging member 22 on the left side vibrates and revolves against the spring member 33 caused by the frictional force between the outer sleeve 23 and member 22 in FIG. 3d and the rotation of the input shaft 11 is transmitted to the output shaft 12 by the torsion bar 13 and the above-described mechanical connection.

Furthermore, when the electric motor 24 arrives at the condition in which it is not able to rotate while assisting the rotation of the input shaft 11 and the input shaft 11 is returned to the opposite direction, the engaging member 22 on the left side of the pair of members 22 presses rightwardly (return side direction) by the end surface of the left side of the hole 11d and the engaging member 22 on the left side is separated from the inner surface of the outer sleeve 23. Thereby, the clutch device is set to an OFF condition and the input shaft 11 and the output shaft 12 are in a condition in which they are able to rotate, and manual steering is possible.

Further, even though the electric motor 24 is rotated by the erroneous operation of the control device 29 under the condition in which the vehicle is going straight ahead, the clutch device does not accomplish the transmission of the rotational force between the input shaft 11 and the output shaft 12 as long as the relative rotation between the input shaft 11 and the output shaft 12 (the elastic deformation of the torsion bar 13 = the input torque Tm) becomes more than the predetermined value (steering torque T1), and the phenomenon by which the steering wheel 10 is suddenly rotated is not generated. As discussed above with respect to erroneous operations, if electric motor 24 were rotated erroneously in the counterclockwise direction, engaging member 22 on the left side would "vibrate" or slip against the outer sleeve. Conversely, if electric motor 24 were rotated erroneously in the clockwise direction, engaging member 22 on the right side would "vibrate" or slip against the outer sleeve. In each instance, the clutch device would be effectively in the OFF condition.

As discussed above, road reaction forces are directed in opposition to steering forces. Consequently, in case of a quick steering movement accomplished in spite of the condition in which the road reaction force is large, since the pressing of the input shaft 11 against the inner surface of the outer sleeve 23 and the end surface of the six-angle portion 12b becomes large in proportion to the dimensions of the relative rotation between the input shaft 11 and the output shaft 12, the performance of the response of the operation of the clutch device in regard to the quick steering movement is good and the rotational force of the electric motor 24 is assuredly transmitted to the output shaft 12.

As mentioned above, according to this embodiment, it is possible to improve the safety performance and the reliability of the electric power steering system by controlling the intermittent operation of the clutch device, the transmission of the rotation between the electric motor 24 and the output shaft 12 being in response to the measure of the elastic deformation of the torsion bar 13 for detecting the relative rotation between the input shaft 11 and the output shaft 12. Further, it is possible to improve the steering wheel feeling and the reliability of the clutch device of the electric power steering system.

Figure 7:
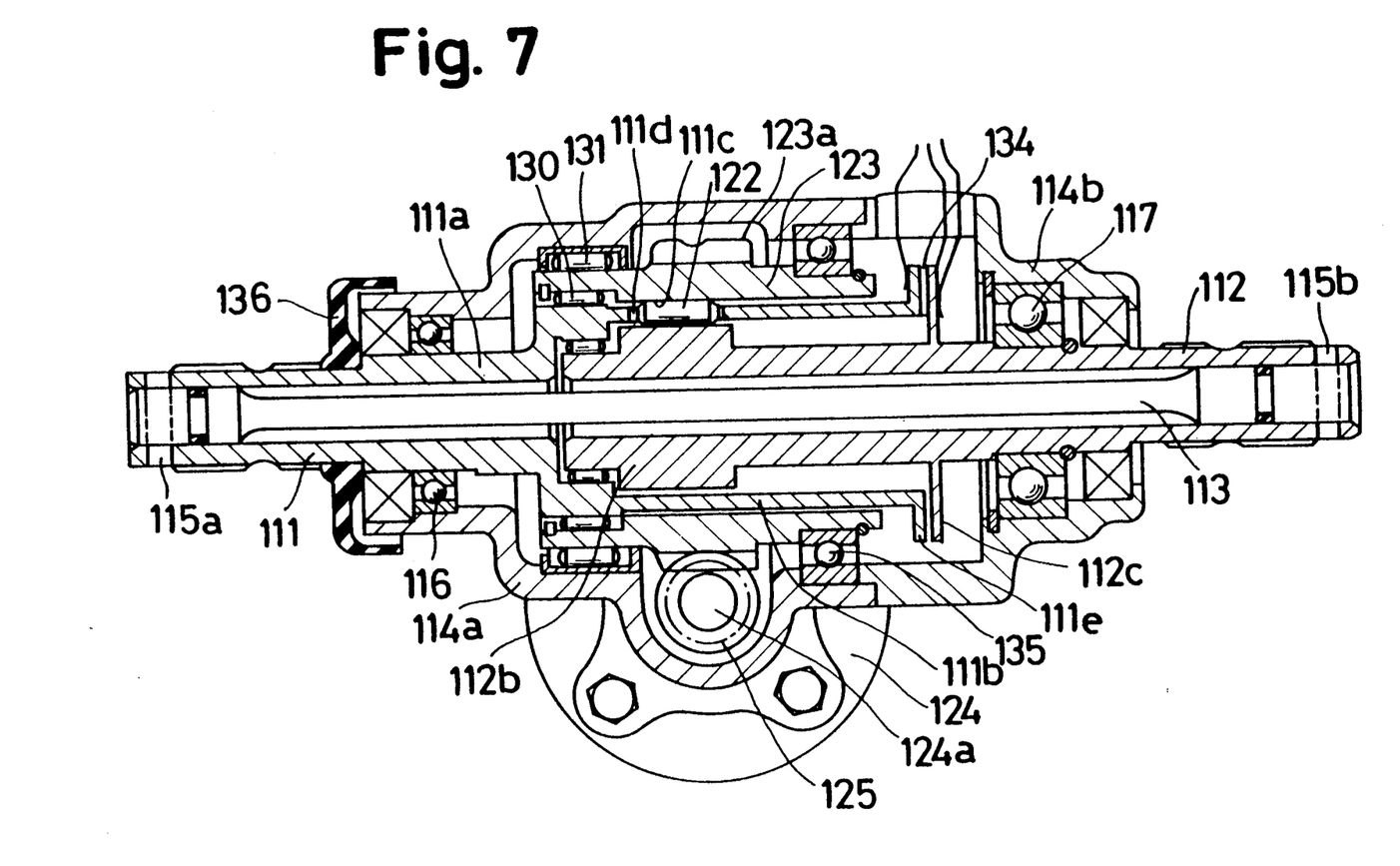
FIG. 7 is a sectional view of an electric power steering system of a second embodiment of the present invention.

FIG. 7 shows the second embodiment of the electric power steering system of the present invention. In this embodiment, the same parts as compared with FIG. 2 are shown but the previous reference numerals for elements of FIG. 2 are added to 100 in the embodiment of FIG. 7. The main difference between FIG. 2 and FIG. 7 is the application of a slip ring as a steering torque detecting means of the present invention.

In FIG. 7, a flange portion 111e is formed on the end portion of the large-diameter portion 111b of the input shaft 111 and a corresponding flange portion 112c is formed on the outer circumference surface of the output shaft 112. A brush 134 is interposed between the flange portions 111e and 112c, and thereby the slip ring detects an electrical signal in response to the relative rotation between the flange portions 111e and 112c. In this embodiment, the structure for detecting the relative rotation is simplified in comparison with the cantilever/strain gage embodiment of FIG. 2. Since the number of parts is reduced, play between the parts is reduced and detection with high accuracy is possible. Now, since the structure, operation and effect of the embodiment of FIG. 2 are the same as the embodiment of FIG. 7, a detailed description of the embodiment of FIG. 7 is omitted.

Now, the above-described two embodiments utilize a cantilever and slip ring type of detecting means respectively as a steering torque detecting means of the present invention. But it is possible to also utilize a potentiometer, an optical or photoelectric type of detecting device such as a photo interrupter, a magnetic strain type detecting means and so on as a steering torque detecting means in accordance with the present invention. Further, it is possible to use a level gear, a helical gear and so on instead of the worm wheel and worm gear as a reduction device.

As mentioned above, according to the present invention, the steering torque detecting member detects the steering torque in response to the elastic deformation of the elastic member connecting the input shaft and the output shaft, and the intermittent operation of the clutch device is controlled by the elastic deformation of the elastic member and the rotation of the electric motor in correspondence to the steering torque detected by the steering torque detecting means.

Therefore, the clutch device operates to transmit the rotation of the electric motor to the output shaft only when the relative rotation (the steering torque T) between the input shaft and the output shaft becomes more than the predetermined value and the direction of the relative rotation coincides with the rotational direction of .the reduction device. The clutch device does not operate (maintains an OFF condition) when the direction of the relative rotation does not coincide with the rotational direction of the reduction device. Accordingly, even though the electric motor is rotated in an opposite direction in regard to the rotational direction corresponding to the relative rotation of the input shaft by the erroneous operation of the control device, manual steering is still possible and the steering operation is not rendered impossible. Therefore, it is possible to improve the safety performance and reliability of an electric power steering system.

Further, according to the present invention, since the steering torque detecting means and the clutch device share the elastic member in common, it is possible to lessen the problematic effects of the conventional electric power steering system.

Furthermore, according to the present invention, the measure of elastic deformation by which the clutch device becomes set to an ON condition (the input shaft is connected with the output shaft) is predetermined to a value which is smaller than the measure of the elastic deformation at which the electric motor begins to rotate.

Therefore, since the rotation of the electric motor begins under the condition at which the clutch device is set to an ON condition in advance and the rotational force of the electric motor is transmitted to the output shaft via the clutch device, a shock and so on are not transmitted to the steering wheel when the rotational force is transmitted. Thereby, it is possible to obtain a smooth steering feeling and to generally improve the steering feeling of an electric power steering system.

And, furthermore, according to the present invention, the clutch device is provided with a spring member which increases its engaging force in proportion to the steering torque. Consequently, the measure of elastic deformation of the elastic member at which the spring member is completely compressed by the rotation of the input shaft is predetermined to a value which is larger than the measure of the elastic deformation of the elastic member which mechanically connects the input shaft to the output shaft.

Therefore, it is possible to ensure the sure operation of the clutch device when the electric motor is normally rotated. Further, since the steering torque from the input shaft is prevented from being transmitted to the output shaft via the completely compressed spring member, it is possible to prevent damage to the spring member and it is also possible to improve the reliability of the clutch device.

Although certain specific embodiments of the present invention have been shown and described, it is also obvious that many modifications thereof are not restricted to the embodiments of the drawings and descriptions thereof, but the present invention is considered to include reasonable and obvious equivalents.

We claim:

1. An electric power steering system comprising:
   an input shaft connected to a steering wheel, said input shaft being provided with a multi-angle portion,
   an output shaft connected to a steering gear, said output shaft being provided with a multi-angle portion by which said multi-angle portion of said input shaft encircles said multi-angle portion of said output shaft by a predetermined distance,
   an elastic member connecting said input shaft with said output shaft,
   a steering torque detecting means for detecting a steering torque between said input shaft and said output shaft and for generating a signal in response to a torsional deformation of said elastic member,
   an electric motor controlling rotation of the output shaft by a control signal from a control device in response to the detecting signal from the steering torque detecting means, and
   a mechanical clutch device interposed between said electric motor and said output shaft and controlling an intermittent transmission of the rotational force of the electric motor to said output shaft in response to a relative rotation between said input shaft and said output shaft detected by the steering torque detecting means, said mechanical clutch device comprising an outer sleeve coaxially disposed with and having a gap in regard to said multi-angle portion of said output shaft and engaging members interposed in said gap and being engaged at an inner surface of said outer sleeve and an outer surface of said output shaft in response to the relative rotation between said input shaft and said output shaft whereby a rotational force of said electric motor is transmitted to said output shaft.

2. An electric power steering system according to claim 1, wherein the relative rotation between said input shaft and said output shaft detected by the steering torque detecting means by which said mechanical clutch device is engaged and controlling an intermittent transmission of the rotation of the electric motor to said output shaft is predetermined to a value which is smaller than a value of relative rotation between said input shaft and said output shaft detected by the steering torque detecting means at which said electric motor begins to rotate.

3. An electric power steering system according to claim 1, said mechanical clutch further comprising spring members interposed in said gap and disposed between said engaging members, said spring members providing spring force directed toward each of said engaging members and in the direction of relative rotation between said input shaft and said output shaft so to urge said engaging members toward the engagement between the engagement members and the inner surface of said outer sleeve and the outer surface of said output shaft and increasing the engaging force of said engaging member by being compressed in response to the relative rotation between said input shaft and said output shaft.

4. An electric power steering system according to claim 3, wherein said input shaft is mechanically connected to said output shaft by means of a mechanical connection between said multi-angle portion of the input shaft and said multi-angle portion of the output shaft in response to the rotation of said input shaft.

5. An electric power steering system according to claim 4, wherein the value of relative rotation between said input shaft and said output shaft detected by said torque detecting means as torsional elastic deformation of the elastic member connecting said input shaft to said output shaft at which said spring members are completely compressed by the rotation of said input shaft is predetermined to value which is larger than a value of torsional elastic deformation of said elastic member.

6. An electric power steering system comprising:
   an input shaft connected to a steering wheel, said input shaft provided with a multi-angle portion;
   an output shaft connected to a steering gear, said output shaft provided with a multi-angle portion, said input and output shafts arranged such that said multi-angle portion encircles said multi-angle portion of said output shaft by a predetermined distance;
   an elastic member connecting said input shaft with said output shaft,
   a steering torque detecting means for detecting a steering torque between said input shaft and said output shaft and for generating a signal in response to a torsional deformation of said elastic member,
   an electric motor controlling rotation of the output shaft by a control signal from a control device in response to the detecting signal from the steering torque detecting means; and
   a mechanical clutch device interposed between said electric motor and said output shaft, said mechanical clutch device controlling an intermittent transmission of the rotation of the electric motor to said output shaft in response to a relative rotation between said input shaft and said output shaft detected by the steering torque detecting means, such that the relative rotation between said input and output shafts detected by the steering torque detecting means by which said mechanical clutch device is controlling an intermittent transmission of the rotation of the electric motor to said output shaft is predetermined to value which is smaller than a value of relative rotation between said input and output shafts detected by the steering torque detecting means at which said electric motor begins to rotate, said mechanical clutch device including an outer sleeve coaxially disposed with and having a gap in regard to said multi-angle portion of said output shaft and decreasing the rotational force of said electric motor transmitted to said output shaft, engaging members interposed in said gap and being engaged at an inner surface of said outer sleeve and an outer surface of said output shaft, and spring members interposed in said gap and disposed between said engaging members, said spring members providing spring force directed toward each of said engaging members and in the direction of relative rotation between said input shaft and said output shaft so to urge said engaging members toward the engagement between the engagement members and the inner surface of said outer sleeve and the outer surface of said output shaft and increasing the engaging force of said engaging members by being compressed in response to the relative rotation between said input shaft and said output shaft.

7. An electric power steering system according to claim 6, wherein said input shaft is mechanically connected to said output shaft by means of a mechanical connection between said angle portion of the input shaft and said six-angle portion of the output shaft in response to the rotation of said input shaft.

8. An electric power steering system according to claim 7, wherein the value of relative rotation between said input shaft and said output shaft detected by said torque detecting means as torsional elastic deformation of the elastic member connecting said input shaft to said output shaft at which said spring members are completely compressed by the rotation of said input shaft is predetermined to a value which is larger than a value of torsional elastic deformation of said elastic member.

* * * * *